United States Patent
Roger et al.

(10) Patent No.: US 9,841,497 B2
(45) Date of Patent: Dec. 12, 2017

(54) METHOD, DEVICE AND SYSTEM FOR PROCESSING RADAR SIGNALS

(71) Applicant: Infineon Technologies AG, Neubiberg (DE)

(72) Inventors: Andre Roger, Munich (DE); Romain Ygnace, Munich (DE); David Addison, Bristol (GB)

(73) Assignee: Infineon Technologies AG, Neubiberg (DE)

( * ) Notice: Subject to any disclaimer, the term of this patent is extended or adjusted under 35 U.S.C. 154(b) by 371 days.

(21) Appl. No.: 14/296,886

(22) Filed: Jun. 5, 2014

(65) Prior Publication Data
US 2015/0355319 A1    Dec. 10, 2015

(51) Int. Cl.
| | |
|---|---|
| G01S 13/02 | (2006.01) |
| G01S 7/35 | (2006.01) |
| G01S 13/34 | (2006.01) |
| G01S 13/42 | (2006.01) |
| G01S 13/93 | (2006.01) |

(52) U.S. Cl.
CPC .............. *G01S 13/02* (2013.01); *G01S 7/352* (2013.01); *G01S 13/343* (2013.01); *G01S 13/42* (2013.01); *G01S 13/931* (2013.01); *G01S 2007/356* (2013.01)

(58) Field of Classification Search
CPC .... G01S 2007/356; G01S 13/02; G01S 7/352; G01S 13/343; G01S 13/931; G01S 13/42; G06F 5/10; G06F 8/457
See application file for complete search history.

(56) References Cited

U.S. PATENT DOCUMENTS

| | | | | |
|---|---|---|---|---|
| 7,511,659 | B2 * | 3/2009 | Wakayama | G01S 7/2813 342/107 |
| 7,543,010 | B2 * | 6/2009 | Swartzlander, Jr. | G06F 17/142 708/404 |
| 7,683,824 | B2 * | 3/2010 | Kai | G01S 3/48 342/107 |
| 8,633,851 | B2 * | 1/2014 | Vacanti | G01S 7/03 342/149 |
| 2008/0018533 | A1 | 1/2008 | Van Wechel et al. | |
| 2009/0085800 | A1 | 4/2009 | Alland et al. | |
| 2011/0074620 | A1 * | 3/2011 | Wintermantel | G01S 7/032 342/70 |

(Continued)

FOREIGN PATENT DOCUMENTS

| | | |
|---|---|---|
| JP | H4324389 A | 11/1992 |
| WO | 9529479 | 11/1995 |

*Primary Examiner* — Matthew M Barker
(74) *Attorney, Agent, or Firm* — Eschweiler & Potashnik, LLC (57) ABSTRACT

A device is suggested for processing input data received by several antennas, the device including a processing unit including a buffer and at least one multiplier, wherein the processing unit is configured to calculate a second stage FFT result based on input data received by a first antenna, multiply the second stage FFT result for the first antenna with a first compensation value, and store the result in the buffer. The processing unit is further configured to calculate a second stage FFT result based on input data received by a second antenna, multiply the second stage FFT for the second antenna with a second compensation value, and add the result to the value stored in the buffer.

5 Claims, 4 Drawing Sheets

(56) References Cited

U.S. PATENT DOCUMENTS

2011/0122013 A1* 5/2011 Takeya .................... G01S 13/44
 342/109
2016/0124075 A1* 5/2016 Vogt ........................ G01S 7/023
 342/13

* cited by examiner

METHOD, DEVICE AND SYSTEM FOR PROCESSING RADAR SIGNALS

FIELD

Embodiments of the present disclosure relate to radar applications, in particular an efficient way to process radar signals obtained by at least one radar sensor, e.g., via at least one antenna. Processing radar signals in this regard in particular refers to radar signals received by a sensor or an antenna.

BACKGROUND

Several radar variants are used in cars for various application scenarios. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, i.e., a signal distributed across a frequency range. The amplitude of the signal may indicate an amount of echo, wherein a peak may represent a target that needs to be detected and used for further processing, e.g., to adjust the speed of the car based on another car travelling in front.

SUMMARY

A first embodiment relates to a device for processing input data received by several antennas, the device comprising a processing unit comprising a buffer and at least one multiplier. The processing unit is configured to calculate a second stage FFT result based on the input data received by a first antenna, multiply the second stage FFT result for the first antenna with a first compensation value, and store the result in the buffer. The processing unit is further configured to calculate a second stage FFT result based on the input data received by a second antenna, multiply the second stage FFT for the second antenna with a second compensation value and add the result to the value stored in the buffer.

A second embodiment relates to a method for processing input data received by several antennas. The method comprises calculating a second stage FFT result based on input data received by a first antenna, multiplying the second stage FFT result for the first antenna with a first compensation value, and storing the result in a buffer. The method further comprises calculating a second stage FFT result based on the input data received by a second antenna, multiplying the second stage FFT for the second antenna with a second compensation value, and adding the result to the value stored in the buffer.

A third embodiment relates to a device for processing input data received by several antennas comprising means for calculating a second stage FFT result based on input data received by a first antenna, and means for multiplying the second stage FFT result for the first antenna with a first compensation value and storing the result in a buffer. The device further comprises means for calculating a second stage FFT result based on input data received by a second antenna, and means for multiplying the second stage FFT for the second antenna with a second compensation value and adding the result to the value stored in the buffer.

A fourth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

In a radar processing environment, a radar source emits a signal and a sensor detects a returned signal. The returned signal may be acquired in a time domain by at least one antenna, in particular by several antennas. The returned signal may then be converted into the frequency domain by conducting a Fast Fourier Transform (FFT), which may result in a signal spectrum, i.e., a signal distributed across a frequency range. Frequency peaks may be used to determine potential targets, e.g., along a moving direction of a vehicle.

A Discrete Fourier Transform (DFT) may be implemented in computers by numerical algorithms or dedicated hardware. Such implementation may employ FFT algorithms. Hence, the terms "FFT" and "DFT" may be used interchangeably.

The examples provided herein in particular allow for an efficient determining of an azimuth angle of the returned signals that is evaluated across the several antennas.

Figure 1:
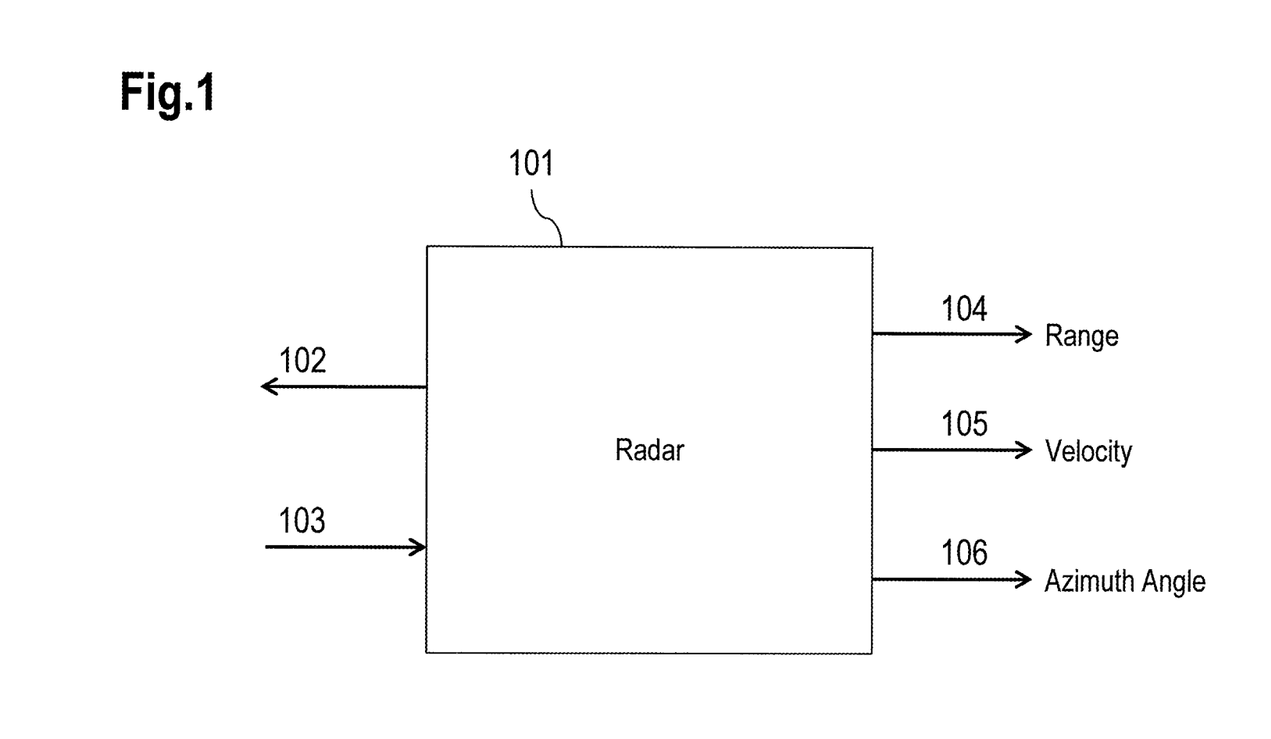
FIG. 1 shows a schematic diagram comprising an example radar system emitting radar signals and receiving returned radar signals.

FIG. 1 shows a schematic diagram comprising an example radar system 101 emitting radar signals 102 and receiving returned radar signals 103. The radar system 101 determines a range 104, a velocity 105 and an azimuth angle 106 based on the returned radar signals 103.

By using several receiving antennas, a phase difference of the received returned radar signals 103 may be used to determine the azimuth angle 106 via a third stage FFT. A first stage FFT based on the received returned (e.g., reflected emitted) radar signals 103 is used to determine the range 104, a second stage FFT based on the range 104 is used to determine the velocity 105 and the third stage FFT based on the velocity 105 is used to determine said azimuth angle 106.

In an example scenario, the emitted radar signals 102 may be originated by two transmitter antennas towards an example object. The signals 102 are reflected at the object and arrive at several (e.g., four) receiving antennas dependent on the azimuth angle with different phase position. Hence, the distances between the single object, the transmitter antennas and the receiver antennas may be deemed different.

In case the single object is considerably far away from the antennas, the beam paths may be treated as being parallel to each other.

Figure 2:
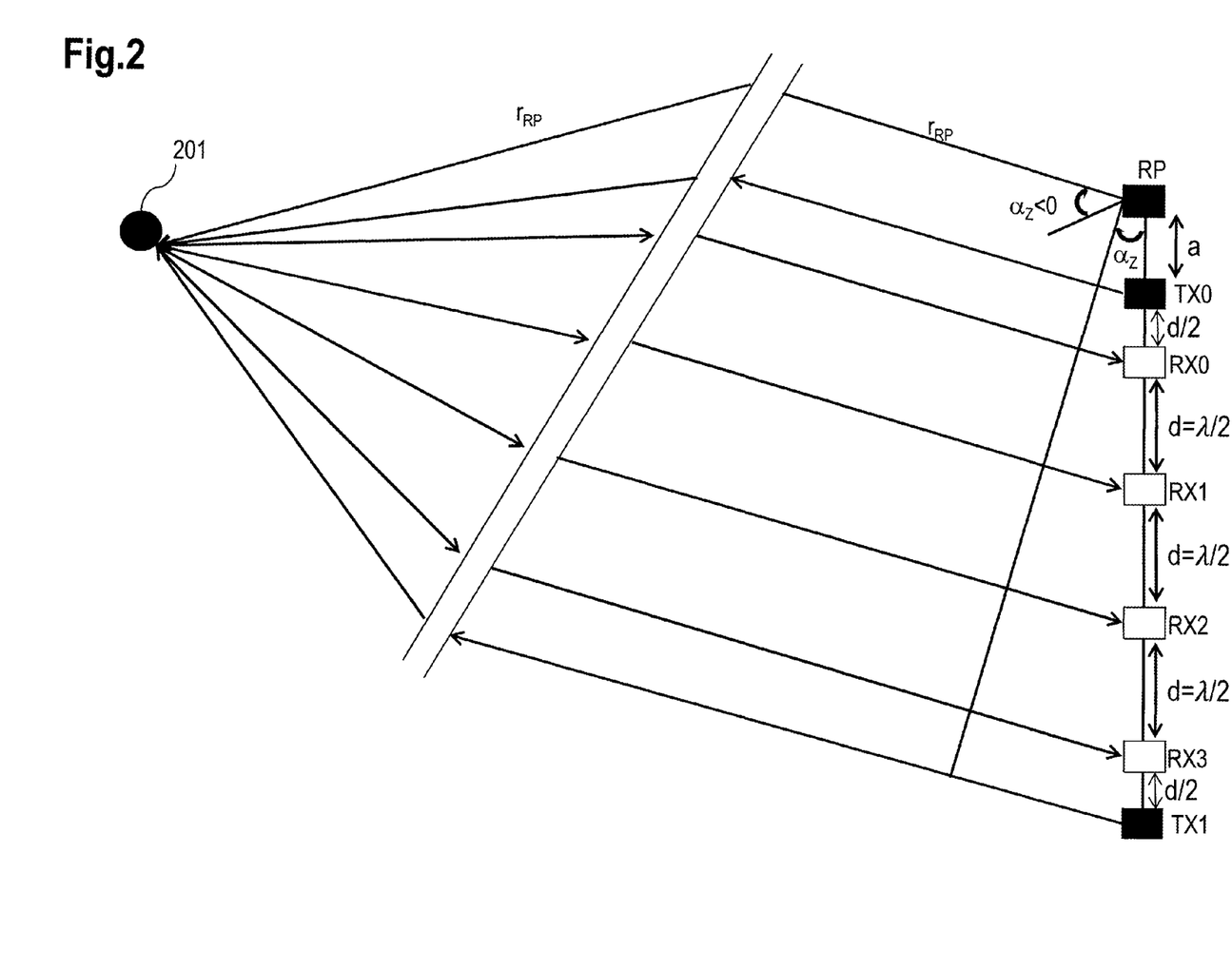
FIG. 2 shows a diagram depicting an object far away from transmitting antennas and receiving antennas as well as signal paths of the emitted radar signals and the returned radar signals based on the reflection at the object.

FIG. 2 shows a diagram depicting an object 201 being considerably far away from transmitting antennas TX0 and TX1 and receiving antennas RX0, RX1, RX2 and RX3. FIG. 2 further shows signal paths of the emitted radar signals and the returned radar signals based on the reflection at the object 201.

A reference path length $r_{RP}$ visualizes a path length from a reference point RP on the antenna plate to the object 201. The path length $r_{RP}$ can be determined according to $$r_{RP} = r - r(m),$$

wherein r is an actual path length comprising the reference path length $r_{RP}$ and the path length r(m);

r(m) is a path length from the reference point RP to the object 201 and back to the receiving antenna m (m=0 . . . 3 in FIG. 2);

m is the number of the receiving antenna RXm, m=0 . . . 3.

In addition, FIG. 2 shows an azimuth angle $\alpha_Z$, a distance "a" between the reference point $r_{RP}$ and the transmitter antenna TX0 and a distance "d" between two receiving antennas, wherein d=$\lambda$/2 ($\lambda$ being the wavelength of the emitted radar signal).

The path length r(m) from the reference point RP to the object 201 and back to the receiving antenna RXm (m=0 . . . 3) can be determined as follows:

$$r(m) = 2 \cdot r_{RP} + \sin(-\alpha_Z) \cdot \left(a + mTX \cdot 4d + a + \frac{d}{2} + mRX \cdot d\right) ==$$

$$2 \cdot r_{RP} + \sin(-\alpha_Z) \cdot \left(2a + \frac{d}{2} + m \cdot d\right)$$

A phase difference $\phi(m) - \phi(m-1)$ between receiving waves for the antenna combination m and the antenna combination m−1 can be determined as:

$$\varphi(m) - \varphi(m-1) =$$

$$-\frac{2\pi}{\lambda} \cdot [r(m) - r(m-1)] == -\frac{2\pi}{\lambda} \cdot \sin(-\alpha_Z) \cdot d == \frac{2\pi}{\lambda} \cdot \sin(\alpha_Z) \cdot d$$

Hence, the azimuth angle $\alpha_Z$ depends on phase differences. The phase differences may change linearly, because of the same distances d (wherein d=$\lambda$/2) between the receiving antennas.

A digital beam forming (DBF) may be conducted for each range-relative-speed gate, e.g., for each FFT ramp. Sums may be determined over complex values obtained after two subsequent FFT stages, i.e., based on the second stage FFT and on values obtained by several, e.g., four, receiving antennas. Each second stage FFT result (per receiving antenna) may be multiplied by a (e.g., complex) factor $W_i$ with a linearly increasing phase for phase compensating purposes. This results in radiation lobes with different beam directions. Hence, a phase difference between received signals may be weighted with such factor $W_i$.

Figure 3:
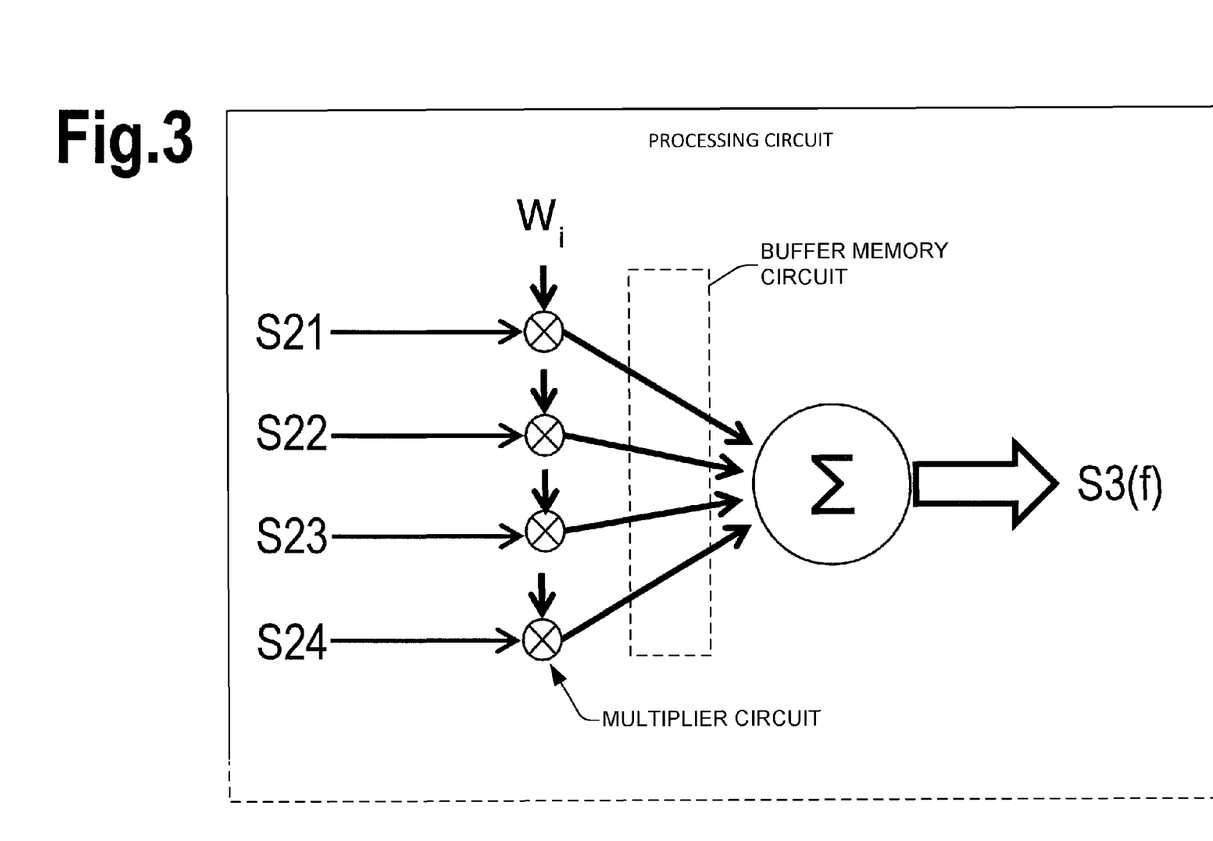
FIG. 3 shows a schematic diagram with input signals, each being a result of a second stage FFT, wherein the input signals are multiplied with a complex factor and the result of the multiplications is accumulated and fed to a third stage FFT S3(f) to determine the azimuth angle.

FIG. 3 shows a schematic diagram with input signals S21, S22, S23 and S24, each of which being a result of a second stage FFT. Each input signal S21, S22, S23 and S24 is multiplied with a complex factor Wi (i=1 . . . 4) and the result of the multiplications is accumulated and fed to a third stage FFT S3(f) to determine the azimuth angle.

The examples provided herein in particular allow for an efficient calculation of the sum of the outputs of the second stage FFT. The second stage FFTs may be calculated across ramps, wherein each ramp may have a predetermined duration during which the frequency of the emitted radar signal was changed, e.g., increased. In other words, each ramp may comprise signals of increasing frequency and a succession of ramps may determine the radar signal that is emitted via the transmitting antennas. The emitted radar signal is reflected at the (distant) object and the reflection of the radar signal is received at the receiving antennas and sampled. Hence, received samples (for each antenna) may correspond to the signals of the ramp (i.e., for each ramp signals of increasing frequencies). The received samples may be processed via FFT(s).

Examples presented herein in particular provide an efficient calculation based on at least one of the following considerations:

(a) An addition may be conducted on the fly with FFT results that are already available.

(b) The addition may utilize a buffer, in particular a result line buffer, and a multiplier.

(c) A second stage FFT is calculated. Each FFT bin result (i.e., result per ramp of frequencies) is multiplied with an antenna compensation value (i.e., said factor $W_i$), which can be 1 or a complex value. The result may be saved in the buffer. Also, the (partial) FFT result may be saved in the buffer.

(d) Instead of calculating the next FFT result for the same antenna, the subsequent FFT result for the next antenna is determined, multiplied with a compensation value (if applicable) and added to the previous sum. Hence, the third stage FFT result is calculated across the antennas and stored in the buffer.

Hence, after the last FFT result for the last antenna is calculated (and multiplied with its compensation value) and added to the buffer, the buffer comprises a non-coherent integration over N antennas. This may then be saved to the memory.

(e) Next, the subsequent second stage FFT values are processed across the antennas.

Figure 4:
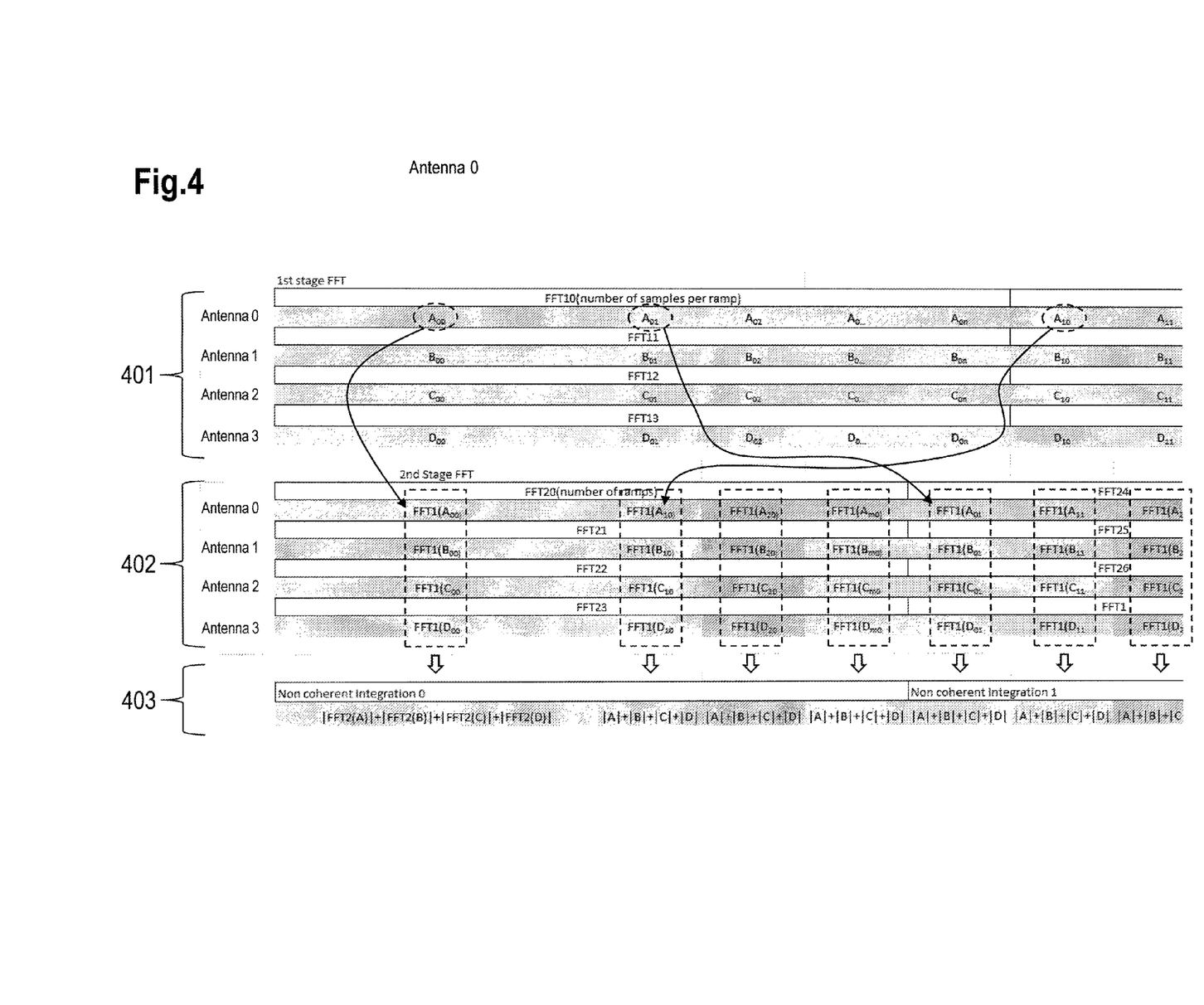
FIG. 4 shows a diagram visualizing the efficient concept of a non-coherent integration.

FIG. 4 shows a diagram visualizing the efficient concept of a non-coherent integration.

A first stage FFT 401 comprises samples of the returned received radar signals per antenna, wherein the samples $A_{00}, A_{01}, \ldots, A_{0n}$ correspond to a first ramp of samples received by an antenna 0, the samples $A_{10}, \ldots, A_{1n}$ correspond to a second ramp of samples received by the antenna 0, the samples $B_{00}, B_{01}, \ldots, B_{0n}$ correspond to a first ramp of samples received by an antenna 1, the samples $B_{10}, \ldots, B_{1n}$ correspond to a second ramp of samples received by the antenna 1, the samples $C_{00}, C_{01}, \ldots, C_{0n}$ correspond to a first ramp of samples received by an antenna 2, the samples $C_{10}, \ldots, C_{1n}$ correspond to a second ramp of samples received by the antenna 2, and the samples $D_{00}, D_{01}, \ldots, D_{0n}$ correspond to a first ramp of samples received by an antenna 3, the samples $D_{10}, \ldots, D_{1n}$ correspond to a second ramp of samples received by the antenna 3.

Hence, the ramp comprises n samples. At least one transmission antenna emits a ramp of signals, e.g., signals of varying frequency, which is reflected at the (distant) object and received by the antennas 0 to 3 and sampled as returned received radar signals (samples). The samples are processed in said first stage FFT 401.

The result of the first stage FFT 401 is further processed in a second stage FFT 402. In a FFT10 block (first stage FFT), the number of samples per ramp are processed and in a FFT20 block (second stage FFT), the results of the first stage FFT across the ramps are processed, etc.

In a non-coherent integration stage 403, the results of the second stage FFT across the antennas are accumulated as described above.

This FFT computation sequence enables an efficient and in particular fast architecture for radar processing purposes. This allows for tightly coupling a non-coherent integration unit to the FFT via a specific computation sequence in particular utilizing a buffer and a multiplier (in case a compensation value different to "1" is used).

The examples presented allow reducing a significant amount of memory transfers, which leads to a reduced computation time and to a reduced power consumption.

The examples suggested herein may in particular be based on at least one of the following solutions. In particular combinations of the following features could be utilized in order to reach a desired result. The features of the method could be combined with any feature(s) of the device, apparatus or system or vice versa.

A device is suggested for processing input data received by several antennas, the device comprising:
 a processing unit comprising a buffer and at least one multiplier, wherein the processing unit is configured to
  calculate a second stage FFT result based on input data received by a first antenna,
  multiply the second stage FFT result for the first antenna with a first compensation value and storing the result in the buffer,
  calculate a second stage FFT result based on input data received by a second antenna,
  multiply the second stage FFT for the second antenna with a second compensation value and add the result to the value stored in the buffer.

Advantageously, FFT results for the next antennas are determined, multiplied with a compensation value (if applicable) and added to the previous sum. The result of the addition may be further processed by a third stage FFT result.

Hence, after the last FFT result for the last antenna is calculated (and multiplied with its compensation value) and added to the buffer, the buffer comprises a non-coherent integration over N antennas. This may then be saved to the memory and used for further processing, e.g., determining an azimuth angle. The azimuth angle can be determined via the third stage FFT, wherein peaks in the FFT result indicate the azimuth angle.

This approach reduces the amount of memory transfers required, which leads to a reduced computation time and to a reduced power consumption of the device.

In an embodiment, the multiplication and adding to the buffer is processed across the several antennas.

In an embodiment, the processing unit is configured to conduct the steps for each second stage FFT value across the several antennas.

In an embodiment, a third stage FFT result is determined based on the value stored in the buffer.

This third stage FFT result can be used to determine the azimuth angle, i.e., a phase difference of the returned radar signals received across the several antennas.

In an embodiment, an azimuth angle is determined based on the third stage FFT.

In an embodiment, the second stage FFT result is based on a first stage FFT result.

In an embodiment, the compensation value is set for each multiplication.

In particular compensation values can be set individually for each multiplication or for several multiplications. It is noted that different or same compensation values can be used.

Each second stage FFT result (per receiving antenna) may be multiplied by a (e.g., complex) compensation factor (also referred to as "factor Wi"), which may have a linearly increasing phase for phase compensating purposes. This may result in radiation lobes with different beam directions.

In an embodiment, the compensation value is 1.

In an embodiment, the compensation value is a complex value.

It is noted that the features described above are in particular equally applicable with regard to the other solutions, e.g., method, device, and/or computer program product.

Hence, a method for processing input data received by several antennas is provided, the method comprising:
 calculating a second stage FFT result based on input data received by a first antenna,
 multiplying the second stage FFT result for the first antenna with a first compensation value and storing the result in a buffer,
 calculating a second stage FFT result based on input data received by a second antenna,
 multiplying the second stage FFT for the second antenna with a second compensation value and adding the result to the value stored in the buffer.

Further, a device is suggested for processing input data received by several antennas comprising:
 means for calculating a second stage FFT result based on input data received by a first antenna,
 means for multiplying the second stage FFT result for the first antenna with a first compensation value and storing the result in a buffer,
 means for calculating a second stage FFT result based on input data received by a second antenna, and
 means for multiplying the second stage FFT for the second antenna with a second compensation value and adding the result to the value stored in the buffer.

Also, a computer program product is provided, which is directly loadable into a non-transitory storage medium such as a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A radar device for processing input data based on signals received by a plurality of antennas, the radar device comprising:
    a processing circuit of the radar device comprising a buffer memory circuit and at least one multiplier circuit, wherein the processing circuit is configured to, for each of at least two of the plurality of antennas:
        calculate a second stage FFT result based on input data that is based on signals received by the respective antenna, wherein each second stage FFT result is based on a first stage FFT result, and
        multiply the second stage FFT result for the respective antenna with a respective compensation value,
    wherein the processing circuit is further configured to:
        store the multiplication result of a first of the at least two antennas in the buffer memory circuit as an initial result, and subsequently add and store the multiplication results of each of the other of the at least two antennas consecutively to the initial result to form a running summation result in the buffer memory circuit,
        calculate a third stage FFT result based on a final summation result stored in the buffer, and
        determine an azimuth angle based on the third stage FFT result.

2. The device according to claim 1, wherein the compensation value is 1.

3. The device according to claim 1, wherein the compensation value is a complex value.

4. A method for processing input data based on signals received by a plurality of antennas of a radar device, the method comprising:
    for at least two antennas of the plurality of antennas:
        calculating a second stage FFT result based on input data that is based on signals received by the respective antenna using a processing circuit of the radar device, wherein each second stage FFT result is based on a first stage FFT result, and
    the method further comprising:
        multiplying the second stage FFT result for the respective antenna with a respective compensation value using the processing circuit;
        storing the multiplication result of a first of the at least two antennas in a buffer memory circuit as an initial result, and subsequently adding and storing the multiplication results of each of the other of the at least two antennas consecutively to the initial result to form a running summation result in the buffer memory circuit;

calculating, using the processing circuit, a third stage FFT result based on a final summation result stored in the buffer; and determining, using the processing circuit, an azimuth angle based on the third stage FFT result.

5. A non-transitory storage medium having instructions stored thereon for execution by a processing circuit in conjunction with a buffer memory circuit and at least one multiplier circuit within a radar device having a plurality of antennas, that when executed by the processing circuit, cause the processing circuit to:

for each of at least two of the plurality of antennas:
calculate a second stage FFT result based on input data that is based on signals received by the respective antenna, wherein each second stage FFT result is based on a first stage FFT result, multiply the second stage FFT result for the respective antenna with a respective compensation value, and wherein the processing circuit is further configured to:
store the multiplication result of a first of the plurality of antennas in the buffer memory circuit as an initial result, and subsequently add and store the multiplication results of each of the other of the plurality of antennas consecutively to the initial result to form a running summation result in the buffer memory circuit, calculate a third stage FFT result based on a final summation result stored in the buffer memory circuit, and determine an azimuth angle based on the third stage FFT result.

* * * * *